US008685536B2

(12) United States Patent
Kikuchi et al.

(10) Patent No.: US 8,685,536 B2
(45) Date of Patent: Apr. 1, 2014

(54) POLYAMIDE-IMIDE RESIN INSULATING COATING MATERIAL, INSULATED WIRE AND METHOD OF MAKING THE SAME

(75) Inventors: Hideyuki Kikuchi, Hitachi (JP); Yuzo Yukimori, Hitachi (JP)

(73) Assignee: Hitachi Metals, Ltd., Tokyo (JP)

( * ) Notice: Subject to any disclaimer, the term of this patent is extended or adjusted under 35 U.S.C. 154(b) by 622 days.

(21) Appl. No.: 11/312,834

(22) Filed: Dec. 21, 2005

(65) Prior Publication Data

US 2006/0240255 A1 Oct. 26, 2006

(30) Foreign Application Priority Data

Apr. 25, 2005 (JP) ................................ 2005-126811

(51) Int. Cl.

| | |
|---|---|
| ***C08G 18/34*** | (2006.01) |
| ***C08G 18/76*** | (2006.01) |
| ***H01B 3/30*** | (2006.01) |
| ***H01B 13/06*** | (2006.01) |
| ***C09D 5/25*** | (2006.01) |
| ***C09D 179/08*** | (2006.01) |

(52) U.S. Cl.

USPC ............ 428/372; 428/375; 428/378; 528/67; 528/271; 528/84

(58) Field of Classification Search

USPC ..................................................... 528/44–85

See application file for complete search history.

(56) References Cited

U.S. PATENT DOCUMENTS 3,351,561 A 11/1967 Albrecht et al.
3,428,486 A 2/1969 George
3,554,984 A 1/1971 George
3,778,417 A 12/1973 Serres, Jr. et al.
3,833,533 A 9/1974 Holub et al.
4,026,876 A 5/1977 Bateman et al.
4,448,844 A * 5/1984 Osada et al. .................. 428/375
4,505,980 A * 3/1985 Nishizawa et al. ........... 428/383
4,546,162 A * 10/1985 Zecher et al. ................... 528/67
4,950,700 A * 8/1990 Balme et al. ................. 524/111

(Continued)

FOREIGN PATENT DOCUMENTS

CN 1035514 A 9/1989
CN 1604974 A 4/2005

(Continued)

OTHER PUBLICATIONS

Hirata et al., "Resin paste for forming film comprises epoxy resin, organic and/or inorganic microparticles and poly amidoimide resin which is obtained by reacting poly carboxylic acid, diisocyanate and aromatic polyisocyanate in polar solvent", DERWENT publication AN 2004-470930, May 13, 2004, 1 pg.

(Continued)

*Primary Examiner* — Randy Gulakowski
*Assistant Examiner* — Rachel Kahn
(74) *Attorney, Agent, or Firm* — Foley & Lardner LLP

(57) ABSTRACT

A polyamide-imide resin insulating coating material, which is obtained by reacting an isocyanate component with an acid component, has a main solvent component of γ-butyrolactone. In the coating material, a total compounding ratio of 4,4'-diphenylmethane diisocyanate (MDI) and trimellitic anhydride (TMA) is 85 to 98 mol %, where the total compounding ratio is given by averaging a compounding ratio of MDI to the isocyanate component and a compounding ration of TMA to the acid component.

18 Claims, 2 Drawing Sheets

(56) References Cited

U.S. PATENT DOCUMENTS

| | | | | |
|---|---|---|---|---|
| 5,684,119 | A | 11/1997 | Michaud et al. | |
| 5,994,432 | A * | 11/1999 | Michaud | 524/111 |
| 6,051,665 | A * | 4/2000 | Yamada et al. | 525/477 |
| 6,441,083 | B1 | 8/2002 | Kuwamoto et al. | |
| 6,489,013 | B2 | 12/2002 | Nagai et al. | |
| 6,811,875 | B2 | 11/2004 | Kikuchi et al. | |
| 6,818,678 | B2 | 11/2004 | Yamaguchi et al. | |
| 6,914,093 | B2 | 7/2005 | Xu | |
| 7,015,260 | B2 | 3/2006 | Meloni | |
| 7,026,382 | B2 | 4/2006 | Akiba et al. | |
| 7,061,081 | B2 | 6/2006 | Yano et al. | |
| 7,364,799 | B2 | 4/2008 | Kurita et al. | |
| 2003/0232144 | A1 | 12/2003 | Kikuchi et al. | |
| 2004/0236012 | A1 * | 11/2004 | Xu | 524/700 |
| 2004/0249019 | A1 | 12/2004 | Meyer et al. | |
| 2006/0073315 | A1 | 4/2006 | Orikabe | |
| 2006/0240254 | A1 | 10/2006 | Kikuchi et al. | |
| 2006/0240255 | A1 | 10/2006 | Kikuchi et al. | |
| 2009/0301753 | A1 | 12/2009 | Kikuchi et al. | |
| 2011/0240331 | A1 | 10/2011 | Kikuchi et al. | |
| 2011/0290528 | A1 | 12/2011 | Honda et al. | |

FOREIGN PATENT DOCUMENTS

| | | | |
|---|---|---|---|
| EP | 0 332 543 | A1 | 9/1989 |
| JP | 5-148361 | A | 6/1993 |
| JP | 07-126386 | A | 5/1995 |
| JP | 08-092507 | A | 4/1996 |
| JP | 10-247420 | A | 9/1998 |
| JP | 10-334735 | A | 12/1998 |
| JP | 2000095997 | A * | 4/2000 |
| JP | 2001064508 | A * | 3/2001 |
| JP | 2001-307557 | A | 11/2001 |
| JP | 2002-003724 | A | 1/2002 |
| JP | 2002-371182 | A | 12/2002 |
| JP | 2004-137370 | A | 5/2004 |
| JP | 2004-203719 | A | 7/2004 |
| JP | 2004-204187 | A | 7/2004 |
| WO | WO 03/033790 | A1 | 4/2003 |

OTHER PUBLICATIONS

JP 2004-137370A, machine translation, 22 pages.

Hideyuki Kikuchi et al., PTO Office Action, U.S. Appl. No. 11/303,909, Apr. 14, 2009, 14 pages.

Hideyuki Kikuchi et al., PTO Office Action, U.S. Appl. No. 11/303,909, Oct. 2, 2008, 21 pages.

Hideyuki Kikuchi et al., Information Disclosure Statement, U.S. Appl. No. 11/303,909, Dec. 19, 2005, 4 pages.

Hideyuki Kikuchi et al., PTO Office Action, U.S. Appl. No. 11/303,909, Mar. 19, 2010, 18 pages.

Hideyuki Kikuchi et al., USPTO Office Action, U.S. Appl. No. 11/303,909, Aug. 27, 2010, 19 pages.

USPTO Office Action, U.S. Appl. No. 11/303,909, Dec. 21, 2012, 19 pages.

Masakazu Mesaki et al., Hybrid Composites of Polyamide-Imide and Silica Applied to Wire Insulation, IEEE, 2001, pp. 1-4.

USPTO Office Action, U.S. Appl. No. 11/303,909, May 7, 2012, 32 pages.

Hideyuki Kikuchi et al., USPTO Office Action, U.S. Appl. No. 11/303,909, Oct. 5, 2011, 25 pages.

USPTO Office Action, U.S. Appl. No. 11/303,909, Jul. 17, 2013, 16 pages.

* cited by examiner

POLYAMIDE-IMIDE RESIN INSULATING COATING MATERIAL, INSULATED WIRE AND METHOD OF MAKING THE SAME

The present application is based on Japanese patent application No. 2005-126811, the entire contents of which are incorporated herein by reference.

BACKGROUND OF THE INVENTION

1. Field of the Invention

This invention relates to a polyamide-imide resin insulating coating material, an insulated wire, and a method of making the same. In particular, this invention relates to: a polyamide-imide resin insulating coating material that is obtained by, using γ-butyrolactone as a main solvent component, reacting an isocyanate component and an acid component; an insulated wire that a film of the polyamide-imide resin insulating coating material is formed on a conductor; and a method of making the same.

2. Description of the Related Art

The partial discharge is generated such that, when a minute gap exists in an insulation for a wire or cable or between wires, electric field concentrates on that part to cause a weak discharge. Due to the partial discharge generated, the insulation deteriorates. Further, due to the progress of the deterioration, a breakdown will occur.

Especially, in windings used for a motor or transformer, for example, in enameled wires that resin coating material is coated on a conductor and then baked to make a coating film thereon, the partial discharge can be generated mainly between the wires (between the coating films) or between the coating film and the core. Thus, erosion of the coating film may progress mainly due to cutting of molecular chain in the resin coating film or heat generation caused by collision of charged particles. As a result, the breakdown may occur.

In recent years, in a system to drive inverter motors used for energy saving or adjustable speed, many cases have been reported in which inverter surge (steep overvoltage) is generated to cause the motor breakdown. It is found that the motor breakdown is caused by the partial discharge due to the overvoltage of the inverter surge.

In order to prevent the partial discharge erosion, an enameled wire is known which has an insulation made of a resin coating material that inorganic insulating particles such as silica and titania are dispersed in a heat-resistant resin solution with an organic solvent. Such an inorganic insulating particle can provide the enameled wire with the partial discharge resistance, and can further contribute to enhancement in thermal conductivity, reduction in thermal expansion and enhancement in strength.

Known methods of dispersing a silica fine particle as the inorganic insulating particle in a resin solution are such as a method of adding and dispersing a silica fine particles powder into the resin solution, and a method of mixing the resin solution and a silica sol (for example, JP-A-2001-307557 and JP-A-2004-204187). As compared to the method of adding the silica particles powder thereinto, the method of using the silica sol can facilitate the mixing and can offer the coating material that the silica is well dispersed. However, in this case, the silica sol needs a high compatibility with the resin solution.

When a polyamide-imide insulating material is used as the heat-resistant polymer, a solvent to this can be N-methyl-2-pyrrolidone (NMP), N,N-dimethylformamide (DMF), N,N-dimethylacetamide (DMAC), dimethylimidazolidinone (DMI) etc. In general, a solvent is used which contain mainly NMP and is diluted with DMF, aromatic alkylbenzene etc.

However, conventionally, when such a polyamide-imide resin coating material with the solvent containing NMP as the main component is used to disperse the silica fine particles thereinto, the silica fine particles are aggregated not to allow the sufficient dispersion. There is a correlation between the partial discharge resistance of the wire coating film and the surface area of silica particles in the wire coating film. If the coating film is formed by using a silica-dispersed resin coating material with insufficient dispersion, i.e., with many aggregates, the partial discharge resistance of the coating film must be reduced. Therefore, the silica fine particles need to be uniformly dispersed without the aggregates in the coating film.

On the other hand, when the organo-silica sol is used as a silica source, it is prepared by dispersing silica fine particles into an organic solvent such as DMAC, DMF, alcohol and ketone. However, such an organo-silica-sol has a low compatibility with the polyamide-imide resin being dissolved in the NMP, so that the aggregates will be likely generated. Further, even if a uniform dispersion can be obtained under limited conditions, there will be generated problems in long-term keeping quality, stability, and reproducibility.

SUMMARY OF THE INVENTION

It is an object of the invention to provide a polyamide-imide resin insulating coating material that inorganic insulating particles can be uniformly dispersed preventing the aggregation thereof so as to enhance the partial discharge resistance.

It is another object of the invention to provide an insulated wire that a coating film is formed on a conductor by using the polyamide-imide resin insulating coating material.

It is another object of the invention to provide methods of making the polyamide-imide resin insulating coating material and the insulated wire.

(1) According to one aspect of the invention, a polyamide-imide resin insulating coating material, which is obtained by reacting an isocyanate component with an acid component comprises:

a main solvent component of γ-butyrolactone, wherein a total compounding ratio of 4,4'-diphenylmethane diisocyanate (MDI) and trimellitic anhydride (TMA) is 85 to 98 mol %, where the total compounding ratio is given by averaging a compounding ratio of MDI to the isocyanate component and a compounding ration of TMA to the acid component.

In the above invention, the following modifications or changes may be made.

(i) γ-butyrolactone accounts for 70 to 100% by weight of the amount of all solvents of the coating material.

(ii) The polyamide-imide resin insulating coating material further comprises: an organo-silica sol, wherein a silica component of the organo-silica sol accounts for 1 to 100 phr (parts per hundred parts of resin) by weight of a resin component of the polyamide-imide resin coating material.

(2) According to anther aspect of the invention, an insulated wire comprises:

a conductor; and a partial-discharge-resistant insulation coating film formed on the surface of the conductor, wherein the partial-discharge-resistant insulation coating film is made of the polyamide-imide resin insulating coating material as defined in (1).

In the above invention, the following modifications or changes may be made.

(iii) The insulated wire further comprises: an organic insulation coating film formed on the surface of the conductor, wherein the partial-discharge-resistant insulation coating film is formed on the surface of the organic insulation coating film.

(iv) The insulated wire further comprises: an other organic insulation coating film formed on the surface of the partial-discharge-resistant insulation coating film.

(3) According to another aspect of the invention, a method of making a polyamide-imide resin insulating coating material comprises:

reacting an isocyanate component with an acid component by using γ-butyrolactone as a main solvent component to synthesizing the polyamide-imide resin insulating coating material, wherein a total compounding ratio of 4,4'-diphenylmethane diisocyanate (MDI) and trimellitic anhydride (TMA) is 85 to 98 mol %, where the total compounding ratio is given by averaging a compounding ratio of MDI to the isocyanate component and a compounding ration of TMA to the acid component.

In the above invention, the following modifications or changes may be made.

(v) The isocyanate component comprises 70 mol % or more of MDI and 30 mol % or less of isocyanates other than the MDI.

(vi) The acid component comprises 80 mol % or more of TMA and 20 mol % or less of tetracarboxylic dianhydrides.

(vii) The acid component comprises 80 mol % or more of TMA and 20 mol % or less of tricarboxylic dianhydrides.

(4) According to another aspect of the invention, a method of making an insulated wire comprises:

preparing a polyamide-imide resin insulating coating material by reacting an isocyanate component with an acid component by using γ-butyrolactone as a main solvent component to synthesizing the polyamide-imide resin insulating coating material; and coating the polyamide-imide resin insulating coating material on the surface of a conductor and then baking the coating material to form a coating film on the conductor, wherein a total compounding ratio of 4,4'-diphenylmethane diisocyanate (MDI) and trimellitic anhydride (TMA) is 85 to 98 mol %, where the total compounding ratio is given by averaging a compounding ratio of MDI to the isocyanate component and a compounding ration of TMA to the acid component.

In the above invention, the following modifications or changes may be made.

(viii) The method further comprises: forming an organic insulation coating film on the surface of the conductor, wherein the coating film is formed on the surface of the organic insulation coating film.

<Advantages of the Invention>

The polyamide-imide resin insulating coating material can be obtained such that the inorganic insulating particles are uniformly dispersed therein while preventing the aggregation among them.

The insulated wire can be less likely to be subjected to the partial discharge erosion since the conductor is coated by the polyamide-imide resin insulating coating material such that the insulation coating film can be formed with the inorganic insulating particles uniformly dispersed. As a result, the insulated wire can be applied to various inverter-driven systems to significantly elongate the lifetime of electric appliances therewith.

BRIEF DESCRIPTION OF THE DRAWINGS

The preferred embodiments according to the invention will be explained below referring to the drawings, wherein.

DETAILED DESCRIPTION OF THE PREFERRED EMBODIMENTS

Figure 1:
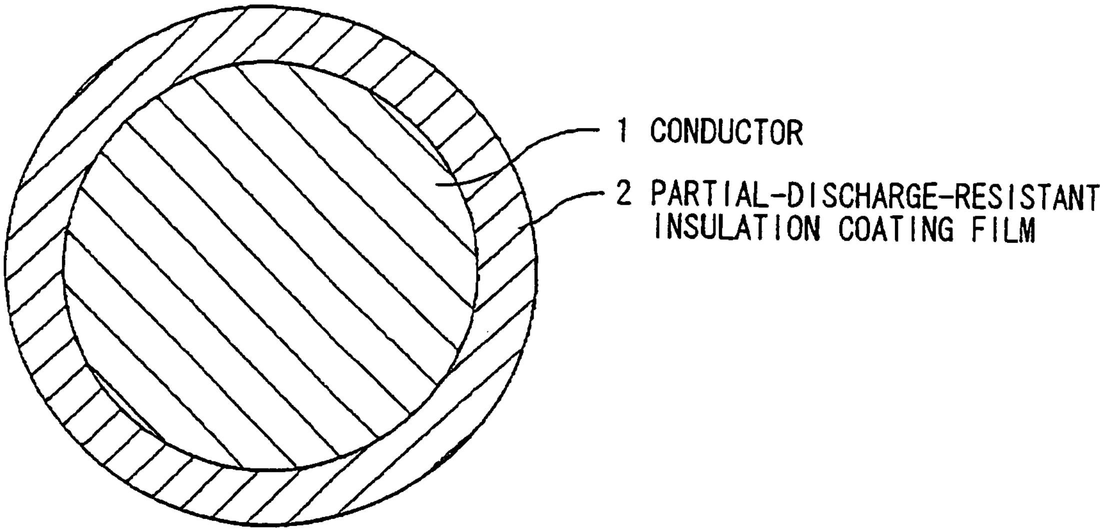
FIG. 1 is a cross sectional view showing an insulated wire in a preferred embodiment according to the invention.

Solvent for Polyamide-Imide Resin Insulating Coating Material

γ-butyrolactone is used as a main solvent component for the polyamide-imide resin insulating coating material, instead of the conventional NMP. Thereby, organo-silica sol which has good compatibility with γ-butyrolactone can be easily dispersed. γ-butyrolactone accounts for preferably 70 to 100% by weight, more preferably 85 to 100% by weight, of the amount of all solvents contained in the polyamide-imide resin insulating coating material. The other solvent components than γ-butyrolactone are desirably a solvent such as NMP, DMAC, DMF, DMI, cyclohexanone and methylcyclohexanone which does not prevent the synthesis reaction of the polyamide-imide resin. Aromatic alkylbenzenes etc. may be used together for purpose of the dilution.

Polyamide-Imide Resin

In general, from the aspect of property or cost, the polyamide-imide resin used most often for enameled wires can be obtained mainly by a two-component synthesis reaction of 4,4'-diphenylmethane diisocyanate (MDI) as an isocyanate component and trimellitic anhydride (TMA) as an acid component. The polyamide-imide resin is formed such that the molecular structure units between amide bond and imide bond are relatively regularly aligned, and it is provided with a little crystal quality due to the hydrogen bond or π-π interaction. It is known that, when a biphenyl structure which is likely to be oriented is, for example, introduced into the molecular skeleton, the resin solubility lowers even for NMP such that the resin is occasionally precipitated.

As the result of many studies, the inventors have found that it is preferable to disturb the relatively regular alignment due to the polyamide-imide raw material to reduce the crystal quality so as to dissolve the polyamide-imide resin into γ-butyrolactone, which has resin solubility lower than NMP.

Isocyanate Components

Isocyanate components suitable for a copolymerization to disturb the relatively regular alignment due to the raw material can be: aliphatic diisocyanates such as hexamethylene diisocyanate (HDI), isophorone diisocyanate (IPDI), dicyclohexylmethane diisocyanate (H-MDI), xylene diisocyanate (XDI) and hydrogenated XDI; or aromatic diisocyanates such as tolylene diisocyanate (TDI) and diphenylsulfone diisocyanate (SDI), other than MDI. Also, they can be polyfunctional isocyanates such as triphenylmethane triisocyanate or polymers such as polymeric isocyanate and TDI. The same effect can be obtained by a compound containing an isomer of TDI or MDI. Of polyamide-imide resins synthesized from MDI and TMA, aromatic diisocyanates are desirable to keep the excellent properties such as heat resistance higher than 200° C. and mechanical property. However, polymeric MDI or liquid monomeric MDI is more desirable to minimize the change of the basic structure. Its compounding ratio is desirably 2 to 30 mol %, more desirably 2 to 15 mol % of the amount of all isocyanates used therein. In order to enhance the solubility, SDI is effective which contains sulfonic group as a binding group. However, it is difficult to use together a biphenyl structure compound such as bitolylene diisocyanate (TODI) and dianisidine diisocyanate (DADI), or diphenylether diisocyanate or naphthalene diisocyanate since it may reversely lower the solubility.

Acid Component

Acid components suitable for a copolymerization to disturb the relatively regular alignment due to the raw material can be: aromatic tetracarboxylic dianhydrides such as 3,3',4,4'-diphenylsulfone tetracarboxylic dianhydride (DSDA), 3,3',4,4'-benzophenone tetracarboxylic dianhydride (BTDA), 4,4'-oxydiphthalic dianhydride (ODPA); alicyclic tetracarboxylic dianhydrides such as butanetetracarboxylic dianhydride and 5-(2,5-dioxotetrahydro-3-furanyl)-3-methyl-3-cyclohexene-1,2-dicarboxylic anhydride; or tricarboxylic acids such as trimesic acid and tris-(2-carboxyethyl) isocyanurate (CIC acid). In view of keeping the property level, the aromatic tetracarboxylic dianhydrides are desirable, and DSDA or BTDA is more desirable because of its good solubility. Tetracarboxylic dianhydrides with an ester group may be used together to provide flexibility. However, it is desired that it is used together in small amounts since it may lower the heat resistance or hydrolysis performance.

On the other hand, pyromellitic dianhydride (PMDA) or 3,3',4,4'-biphenyltetracarboxylic dianhydride (S-BPDA) is difficult to use together since it may lower reversely the solubility. When tetracarboxylic dianhydrides are used together in large amounts, it may lower reversely the solubility since it causes the imidation in decarboxylation of isocyanate and carboxylic anhydride. When tricarboxylic acids are used together, the heat resistance may lower since the ratio of amide group increases. Therefore, they are desirably used together with aromatic tetracarboxylic dianhydrides. In view of these limitations, the compounding ratio of tetracarboxylic dianhydrides and tricarboxylic acids is desirably 2 to 20 mol %, more desirably 2 to 10 mol % of the total acid components used therein.

Compounding Ratio of MDI and TMA

In considering the compounding ratio of the above isocyanate components, when some kinds of the isocyanate components and some kinds of the acid components are copolymerized to synthesize the polyamide-imide resin, the compounding ratio of 4,4'-diphenylmethane diisocyanate (MDI) in the isocyanate components are desirably 70 to 98 mol %, more desirably 85 to 98 mol %. Similarly, in considering the compounding ratio of the above acid components, the compounding ratio of trimellitic anhydride (TMA) in the acid components is desirably 80 to 98 mol %, more desirably 90 to 98 mol %. Further, when a total compounding ratio is defined by averaging the compounding ratio of MDI in the isocyanate components and TMA in the acid components, the total compounding ratio is desirably in the range of 85 to 98 mol %.

Reaction Catalyst

In synthesizing the polyamide-imide resin, a reaction catalyst such as amines, imidazoles and imidazolines may be used. However, it is desired that it does not harm the stability of the coating material.

Organo-Silica Sol

Organo-silica sol that has good compatibility with the γ-butyrolactone is desirably organo-silica sol with γ-butyrolactone only or a mixed dispersion solvent which contains 80% by weight or more of γ-butyrolactone, or organo-silica sol with a mixed dispersion solvent of phenylcarbinol and solvent naphtha. However, it is not specifically limited if it has good compatibility with γ-butyrolactone and does not disturb the curing of polyamide-imide when the polyamide-imide resin coating material is coated and baked to form a coating film.

Partial-Discharge-Resistant Insulating Coating Material

The partial-discharge-resistant insulating coating material can be obtained by mixing the polyamide-imide resin coating material with the organo-silica sol. In the partial-discharge-resistant insulating coating material, it can be easily determined by the transparency of the coating material whether the aggregation among the silica particles is generated.

In this embodiment, since the isocyanate component is copolymerized with the acid component at a predetermined molar ratio, the polyamide-imide resin can be stably dissolved in a solvent with γ-butyrolactone which accounts for 70 to 100% by weight to the amount of all solvents used therein. Thereby, organo-silica sol can be uniformly dispersed in the polyamide-imide resin. Therefore, the transparent, stable and uniform solution of coating material can be obtained without generating the aggregation among the silica particles, the precipitation of resin and the aggregation between the silica particle and the resin.

EXAMPLES

FIG. 1 is a cross sectional view showing an insulated wire in a preferred embodiment according to the invention.

The insulated wire is structured such that a partial-discharge-resistant insulation coating film 2 is formed on a conductor 1. It is manufactured by coating the abovementioned partial-discharge-resistant insulating coating material around the conductor 1 and then baking it.

Figure 2:
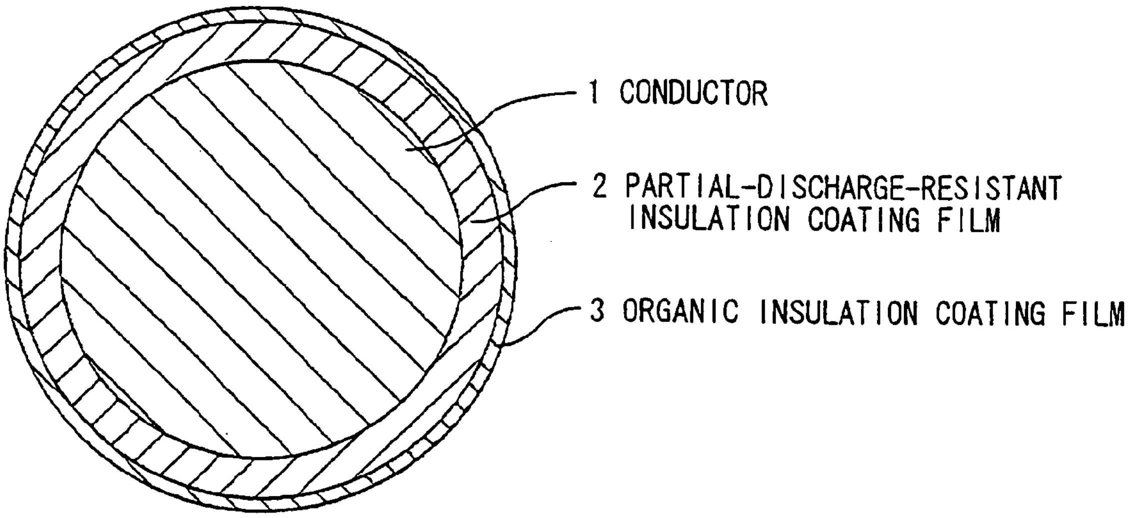
FIG. 2 is a cross sectional view showing an insulated wire in another preferred embodiment according to the invention.

FIG. 2 is a cross sectional view showing an insulated wire in another preferred embodiment according to the invention.

This insulated wire is structured such that an organic insulation coating film 3 is further formed around the partial-discharge-resistant insulation coating film 2 as shown in FIG. 1 in order to enhance the mechanical property (sliding property, scrape-resistant property etc.).

Figure 3:
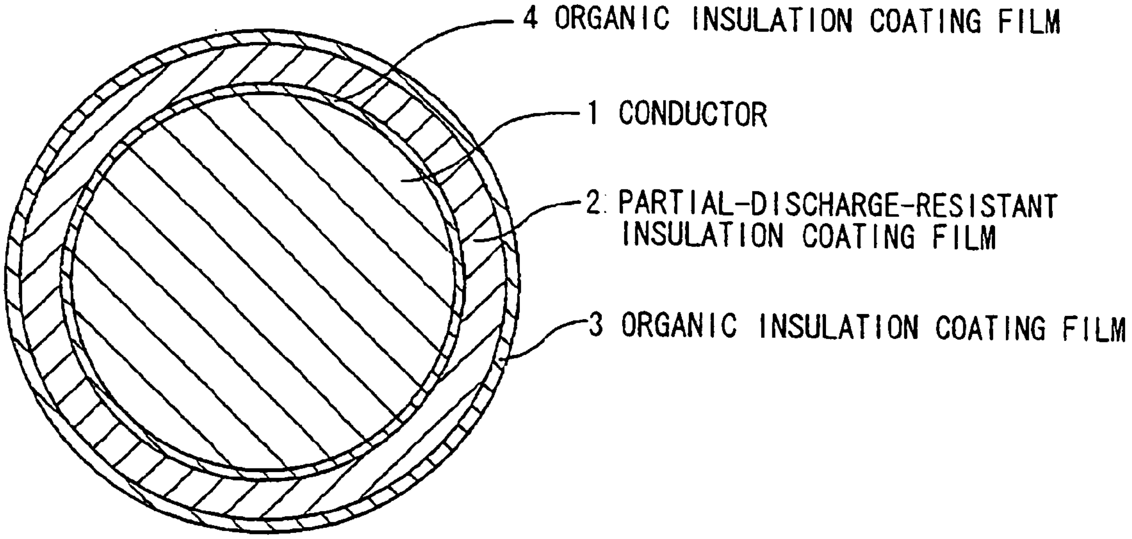
FIG. 3 is a cross sectional view showing an insulated wire in another preferred embodiment according to the invention.

FIG. 3 is a cross sectional view showing an insulated wire in another preferred embodiment according to the invention.

This insulated wire is structured such that an organic insulation coating film 4 is formed on the conductor 1, the partial-discharge-resistant insulation coating film 2 is formed on the organic insulation coating film 4, and the organic insulation coating film 3 is further formed around the partial-discharge-resistant insulation coating film 2.

Method of Making an Enameled Wire

Examples 1-5 and Comparative examples 1-5 as described below are manufactured as follows.

First, raw materials for polyamide-imide resin coating material with a composition as shown in Table 1 are put in a flask with an agitator, a recirculating condenser tube, a nitrogen inlet tube and a thermometer. They are agitated and heated up to 140° C. in about one hour. Then, they are reacted at this temperature for two hours to have polyamide-imide resin coating material with an average molecular weight of about 22000. Then, the reaction product is diluted by solvent such that 300 parts by weight of the solvent component is to 100 parts by weight of polyamide-imide resin.

Then, in preparing the partial-discharge-resistant insulating coating material, as shown in Table 2, the organo-silica sol is prepared such that 300 parts by weight of the dispersion solvent component, which is a dispersion solvent of γ-butyrolactone or a mixed dispersion solvent of phenylcarbinol and naphtha, is to 100 parts by weight of the silica particles with an average particle diameter of 12 nm.

Then, a preparation that 30 parts by weight of the organosilica sol is added to 100 parts by weight of the polyamide-imide resin coating material is agitated to have the partial-discharge-resistant insulating coating material.

The resultant partial-discharge-resistant insulating coating material is coated on a copper conductor with a diameter of 0.8 mm, and then baked to have an enameled wire with a coating film thickness of 30 μm. The enameled wire is evaluated in dimensions, appearance, and V-t characteristic.

Meanwhile, the V-t characteristic is a characteristic to indicate the relationship between a breakdown voltage and a breakdown time. 1 kV voltage with sine waves of 10 kHz is applied to between twisted pair enameled wires, and a time up to the breakdown is measured.

TABLE 1

| | | | Example 1 | Example 2 | Example 3 | Example 4 | Example 5 |
|---|---|---|---|---|---|---|---|
| Raw material composition of polyamide-imide resin coating material | Isocyanate component | MDI | 212.5 (0.85) | 230.0 (0.92) | 187.5 (0.75) | 255.0 (1.02) | 245.0 (0.98) |
| | | Liquid monomeric MDI | 42.5 (0.17) | | | | |
| | | Polymeric MDI | | 28.7 (0.08) | 52.5 (0.15) | | 7.0 (0.02) |
| | | XDI | | | 20.7 (0.11) | | |
| | | HDI | | | | | |
| | Acid component | TMA | 172.8 (0.90) | 172.8 (0.90) | 192.0 (1.00) | 153.6 (0.80) | 188.2 (0.98) |
| | | BTDA | | 32.3 (0.10) | | | |
| | | DSDA | 35.8 (0.10) | | | 35.8 (0.10) | 7.2 (0.02) |
| | | CIC acid | | | | 23.0 (0.07) | |
| | Solvent | γ-butyrolactone | 650 | 850 | 1000 | 950 | 650 |
| | | Cyclohexanone | 350 | | | | |
| | | NMP | | 150 | | | 350 |
| | | DMAC | | | | 50 | |
| | Catalyst | 1,2 dimethyl imidazole | | | 0.5 | | |
| | Diluting solvent | γ-butyrolactone | 300 | 300 | 270 | 320 | 280 |
| | | NMP | | | | | |
| Property of polyamide-imide resin coating material | | Appearance | brown and transparent | brown and transparent | brown and transparent | brown and transparent | brown and transparent |
| | | Nonvolatile matter (wt %) | 25.0 | 25.0 | 25.1 | 25.0 | 25.0 |
| | | Normal temperature stability (day) | 300 or more | 300 or more | 300 or more | 300 or more | 300 or more |
| Ratio of γ-butyrolactone to total amount of solvents (wt %) | | | 73.1 | 88.5 | 100.0 | 96.2 | 72.7 |
| Ratio of MDI to total amount of isocyanate components (mol %) | | | 83.3 | 92.0 | 74.3 | 100.0 | 98.0 |
| Ratio of TMA to total amount of acid components (mol %) | | | 90.0 | 90.0 | 100.0 | 82.5 | 98.0 |
| Total compounding ratio of MDI and TMA (mol %) | | | 86.7 | 91.0 | 87.2 | 91.3 | 98.0 |
| Property of polyamide-imide enameled wire | Dimensions (mm) | Conductor diameter | 0.800 | 0.800 | 0.800 | 0.800 | 0.800 |
| | | Coating film thickness | 0.031 | 0.031 | 0.030 | 0.031 | 0.030 |
| | | Finishing outside diameter | 0.861 | 0.861 | 0.860 | 0.861 | 0.859 |
| | Flexibility: Self diameter winding | | passed | passed | passed | passed | passed |
| | Abrasion resistance: Reciprocating abrasion time (times) | | 431 | 440 | 411 | 452 | 448 |
| | Softening resistance: Short-circuit temperature (° C.) | | 436 | 434 | 430 | 438 | 433 |
| | Thermal deterioration (280° C. × 168 h): breakdown survival rate (%) | | 74.2 | 72.9 | 72.6 | 74.8 | 74.0 |
| | | | Comparative example 1 | Comparative example 2 | Comparative example 3 | Comparative example 4 | Comparative example 5 |
| Raw material composition of polyamide-imide resin coating material | Isocyanate component | MDI | 255.0 (1.02) | 255.0 (1.02) | 167.5 (0.67) | 167.5 (0.67) | 230.0 (0.92) |
| | | Liquid monomeric MDI | | | | 42.5 (0.17) | |
| | | Polymeric MDI | | | 98.0 (0.28) | | 28.7 (0.08) |
| | | XDI | | | | | |
| | | HDI | | | | 30.2 (0.18) | |
| | Acid component | TMA | 192.0 (1.00) | 192.0 (1.00) | 153.6 (0.80) | 172.8 (0.90) | 134.4 (0.70) |
| | | BTDA | | | 64.4 (0.20) | | 96.6 (0.30) |
| | | DSDA | | | | 35.8 (0.10) | |
| | | CIC acid | | | | | |
| | Solvent | γ-butyrolactone | 800 | | 850 | 850 | 850 |
| | | Cyclohexanone | | | | 150 | |
| | | NMP | 200 | 800 | 150 | | 150 |
| | | DMAC | | 200 | | | |
| | Catalyst | 1,2 dimethyl imidazole | | | | | |
| | Diluting solvent | γ-butyrolactone | 270 | | 360 | 280 | 370 |
| | | NMP | | 270 | | | |
| Property of polyamide-imide resin coating material | | Appearance | brown and transparent | brown and transparent | brown and transparent | brown and transparent | clouded |
| | | Nonvolatile matter (wt %) | 25.1 | 25.0 | 24.9 | 25.0 | 25.0 |
| | | Normal temperature stability (day) | 144 (gelatinized) | 300 or more | 183 (gelatinized) | 300 or more | — |

TABLE 1-continued

| | | | | | | |
|---|---|---|---|---|---|---|
| Ratio of γ-butyrolactone to total amount of solvents (wt %) | | 84.3 | 0.0 | 89.0 | 88.3 | 89.1 |
| Ratio of MDI to total amount of isocyanate components (mol %) | | 100.0 | 100.0 | 70.5 | 65.7 | 92.0 |
| Ratio of TMA to total amount of acid components (mol %) | | 100.0 | 100.0 | 80.0 | 90.0 | 70.0 |
| Total compounding ratio of MDI and TMA (mol %) | | 100.0 | 100.0 | 75.3 | 77.9 | 81.0 |
| Property of polyamide-imide enameled wire | Dimensions (mm) Conductor diameter | 0.800 | 0.800 | 0.800 | 0.800 | — |
| | Coating film thickness | 0.030 | 0.031 | 0.030 | 0.030 | — |
| | Finishing outside diameter | 0.860 | 0.861 | 0.860 | 0.860 | — |
| | Flexibility: Self diameter winding | passed | passed | not passed | passed | — |
| | Abrasion resistance: Reciprocating abrasion time (times) | 455 | 450 | 273 | 254 | — |
| | Softening resistance: Short-circuit temperature (° C.) | 431 | 436 | 453 | 382 | — |
| | Thermal deterioration (280° C. × 168 h): breakdown survival rate (%) | 73.0 | 73.5 | 78.1 | 36.8 | — |

TABLE 2

| | | | Example 1 | Example 2 | Example 3 | Example 4 | Example 5 |
|---|---|---|---|---|---|---|---|
| Material composition of partial-discharge-resistant insulating coating material | | Polyamide-imide resin | 100 | 100 | 100 | 100 | 100 |
| | Composition of solvent | γ-butyrolactone | 219 | 265 | 300 | 289 | 218 |
| | | NMP | | 35 | | | 82 |
| | | DMF | | | | 11 | |
| | | Cyclohexanone | 81 | | | | |
| | | Silica | 30 | 30 | 30 | 30 | 30 |
| | Composition of dispersion solvent | γ-butyrolactone | 90 | 90 | | 90 | 90 |
| | | Phenylcarbinol | | | 36 | | |
| | | Solvent naphtha | | | 54 | | |
| Property of partial-discharge-resistant insulating coating material | | Appearance | transparent | transparent | transparent | transparent | transparent |
| | | Normal temperature stability (day) | 300 or more | 300 or more | 300 or more | 300 or more | 300 or more |
| Property of partial-discharge-resistant enameled wire | dimensions [mm] | Conductor diameter | 0.800 | 0.800 | 0.800 | 0.800 | 0.800 |
| | | Coating film thickness | 0.030 | 0.030 | 0.031 | 0.030 | 0.030 |
| | | Finishing outside | 0.860 | 0.860 | 0.861 | 0.859 | 0.860 |
| | | Appearance | transparent | transparent | transparent | transparent | transparent |
| | V-t characteristic[h] 10 kHz-1.0 kV | Without elongation | 77.0 | 75.2 | 79.1 | 77.2 | 74.3 |
| | | With 20% elongation | 45.3 | 44.8 | 44.8 | 40.6 | 43.5 |
| | | | **Comparative example 1** | **Comparative example 2** | **Comparative example 3** | **Comparative example 4** | **Comparative example 5** |
| Material composition of partial-discharge-resistant insulating coating material | | Polyamide-imide resin | 100 | 100 | 100 | 100 | |
| | Composition of solvent | γ-butyrolactone | 253 | | 267 | 265 | |
| | | NMP | 47 | 253 | 33 | | |
| | | DMF | | 47 | | | |
| | | Cyclohexanone | | | | 35 | |
| | | Silica | 30 | 30 | 30 | 30 | |
| | Composition of dispersion solvent | γ-butyrolactone | 90 | 90 | | 90 | |
| | | Phenylcarbinol | | | | | |
| | | Solvent naphtha | | | | | |
| Property of partial-discharge-resistant insulating coating material | | Appearance | transparent | aggregated and clouded | transparent | transparent | |
| | | Normal temperature stability (day) | 73 (gelatinized) | precipitated | 125 (gelatinized) | 300 or more | |
| Property of partial-discharge-resistant enameled wire | dimensions [mm] | Conductor diameter | 0.800 | — | 0.800 | 0.800 | |
| | | Coating film thickness | 0.030 | — | 0.031 | 0.031 | |
| | | Finishing outside | 0.859 | — | 0.861 | 0.861 | |
| | | Appearance | rough surface | — | rough surface | transparent | |
| | V-t characteristic[h] 10 kHz-1.0 kV | Without elongation | 15.0 | — | 18.3 | 75.4 | |
| | | With 20% elongation | 3.2 | — | 5.1 | 40.9 | |

Example 1

212.5 g (0.85 mol) of MDI and 42.5 g (0.17 mol) of liquid monomeric MDI which are the isocyanate component, 172.8 g (0.90 mol) of TMA and 35.8 g (0.10 mol) of DSDA which are the acid component, and 650 g of γ-butyrolactone and 350 g of cyclohexanone which are the solvent are put in the flask. After conducting the synthesis, it is diluted by γ-butyrolactone so as to have the polyamide-imide resin coating material with a resin matter concentration of 25% by weight. The total compounding ratio of MDI and TMA is 86.7 mol %.

Further, the silica sol with a dispersion solvent of γ-butyrolactone is used for the preparation of the partial-discharge-resistant insulating coating material.

Example 2

230.0 g (0.92 mol) of MDI and 28.7 g (0.08 mol) of polymeric MDI which are the isocyanate component, 172.8 g (0.90 mol) of TMA and 32.2 g (0.10 mol) of BTDA which are the acid component, and 850 g of γ-butyrolactone and 150 g of NMP which are the solvent are put in the flask. After conducting the synthesis, it is diluted by γ-butyrolactone so as to have the polyamide-imide resin coating material with a resin matter concentration of 25% by weight. The total compounding ratio of MDI and TMA is 91.0 mol %.

Further, the silica sol with a dispersion solvent of γ-butyrolactone is used for the preparation of the partial-discharge-resistant insulating coating material.

Example 3

187.5 g (0.75 mol) of MDI, 52.5 g (0.15 mol) of polymeric MDI and 20.7 g (0.11 mol) of m-XDI which are the isocyanate component, 192.0 g (1.00 mol) of TMA which is the acid component, 1000 g of γ-butyrolactone which is the solvent, and 0.5 g of 1,2 dimethyl imidazole which is the reaction catalyst are put in the flask. After conducting the synthesis, it is diluted by γ-butyrolactone so as to have the polyamide-imide resin coating material with a resin matter concentration of 25% by weight. The total compounding ratio of MDI and TMA is 87.2 mol %.

Further, the silica sol with a mixed dispersion solvent of phenylcarbinol and naphtha is used for the preparation of the partial-discharge-resistant insulating coating material.

Example 4

255.0 g (1.02 mol) of MDI which is the isocyanate component, 153.6 g (0.80 mol) of TMA, 35.8 g (0.10 mol) of DSDA and 23.0 g (0.07 mol) of CIC acid which are the acid component, and 950 g of γ-butyrolactone and 50 g of DMAC which are the solvent are put in the flask. After conducting the synthesis, it is diluted by γ-butyrolactone so as to have the polyamide-imide resin coating material with a resin matter concentration of 25% by weight. The total compounding ratio of MDI and TMA is 91.3 mol %.

Further, the silica sol with a dispersion solvent of γ-butyrolactone is used for the preparation of the partial-discharge-resistant insulating coating material.

Example 5

245.0 g (0.98 mol) of MDI and 7.0 g (0.02 mol) of polymeric MDI which are the isocyanate component, 188.2 g (0.98 mol) of TMA and 7.2 g (0.02 mol) of DSDA which are the acid component, and 650 g of γ-butyrolactone and 350 g of NMP which are the solvent are put in the flask. After conducting the synthesis, it is diluted by γ-butyrolactone so as to have the polyamide-imide resin coating material with a resin matter concentration of 25% by weight. The total compounding ratio of MDI and TMA is 98.0 mol %.

Further, the silica sol with a dispersion solvent of γ-butyrolactone is used for the preparation of the partial-discharge-resistant insulating coating material.

Comparative Example 1

255.0 g (1.02 mol) of MDI which is the isocyanate component, 192.0 g (1.00 mol) of TMA which is the acid component, and 800 g of γ-butyrolactone and 200 g of NMP which are the solvent are put in the flask. After conducting the synthesis, it is diluted by γ-butyrolactone so as to have the polyamide-imide resin coating material with a resin matter concentration of 25% by weight. The total compounding ratio of MDI and TMA is 100.0 mol %.

Further, the silica sol with a dispersion solvent of γ-butyrolactone is used for the preparation of the partial-discharge-resistant insulating coating material.

Comparative Example 2

255.0 g (1.02 mol) of MDI which is the isocyanate component, 192.0 g (1.00 mol) of TMA which is the acid component, and 800 g of NMP and 200 g of DMAC which are the solvent are put in the flask. After conducting the synthesis, it is diluted by NMP so as to have the polyamide-imide resin coating material with a resin matter concentration of 25% by weight. The total compounding ratio of MDI and TMA is 100.0 mol %.

Further, the silica sol with a dispersion solvent of γ-butyrolactone is used for the preparation of the partial-discharge-resistant insulating coating material.

Comparative Example 3

167.5 g (0.67 mol) of MDI and 98.0 g (0.28 mol) of polymeric MDI which are the isocyanate component, 153.6 g (0.80 mol) of TMA and 64.4 g (0.20 mol) of BTDA which are the acid component, and 850 g of γ-butyrolactone and 150 g of NMP which are the solvent are put in the flask. After conducting the synthesis, it is diluted by γ-butyrolactone so as to have the polyamide-imide resin coating material with a resin matter concentration of 25% by weight. The total compounding ratio of MDI and TMA is 75.3 mol %.

Further, the silica sol with a dispersion solvent of γ-butyrolactone is used for the preparation of the partial-discharge-resistant insulating coating material.

Comparative Example 4

167.5 g (0.67 mol) of MDI, 42.5 g (0.17 mol) of liquid monomeric MDI and 30.2 g (0.18 mol) of HDI which are the isocyanate component, 172.8 g (0.90 mol) of TMA and 35.8 g (0.10 mol) of DSDA which are the acid component, and 850 g of γ-butyrolactone and 150 g of cyclohexanone which are the solvent are put in the flask. After conducting the synthesis, it is diluted by γ-butyrolactone so as to have the polyamide-imide resin coating material with a resin matter concentration of 25% by weight. The total compounding ratio of MDI and TMA is 77.9 mol %.

Further, the silica sol with a dispersion solvent of γ-butyrolactone is used for the preparation of the partial-discharge-resistant insulating coating material.

Comparative Example 5

230.0 g (0.92 mol) of MDI and 28.7 g (0.08 mol) of polymeric MDI which are the isocyanate component, 134.4 g (0.70 mol) of TMA and 96.6 g (0.30 mol) of BTDA which are the acid component, and 850 g of γ-butyrolactone and 150 g of NMP which are the solvent are put in the flask. After conducting the synthesis, it is diluted by γ-butyrolactone so as to have the polyamide-imide resin coating material with a resin matter concentration of 25% by weight. The total compounding ratio of MDI and TMA is 81.0 mol %.

As shown in Tables 1 and 2, the polyamide-imide resin coating materials in Examples 1 to 5 with a total compounding ratio of MDI and TMA of 85 to 98 mol % have normal temperature stability of 300 days or more and good properties in the polyamide-imide enameled wire. Further, the partial-discharge-resistant insulating coating materials with the organo-silica sol mixed therewith have transparency and good stability. The partial-discharge-resistant enameled wires coated with the coating material have good V-t characteristic.

In contrast, comparative Examples 1 and 2 with a total compounding ratio of MDI and TMA of 100.0 mol % have good properties in polyamide-imide enameled wire. However, comparative Example 1 deteriorates in normal temperature stability of polyamide-imide resin coating material, and comparative Example 2 deteriorates in compatibility with organo-silica sol such that it is subjected to aggregation in silica particles and clouded further precipitated. In comparative Example 3 with a total compounding ratio of MDI and TMA of 75.3%, the ratio of MDI and TMA lowers such that the resin balance is disrupted, and the flexibility and abrasion resistance deteriorate. In comparative Example 4 with a total compounding ratio of MDI and TMA of 77.9%, the thermal property lowers since the ratio of isocyanates other than MDI is high. In comparative Example 5 with a total compounding ratio of MDI and TMA of 81.0%, the solubility lowers such that the polyamide-imide resin coating material is clouded since the ratio of imides is too high.

In view of the above results, it is found that the total compounding ratio of MDI and TMA is preferably in the range of 85 to 98 mol %.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. A polyamide-imide resin insulating coating material, comprising:

a polyamide-imide resin obtained by reacting, in a mixed solvent, an isocyanate component comprising (i) 4,4'-diphenylmethane diisocyanate and (ii) an isomer of 4,4'-diphenylmethane diisocyanate other than 4,4'-diphenylmethane diisocyanate, with an acid component comprising a trimellitic anhydride, wherein:

a total compounding ratio, obtained by averaging a compounding ratio of the 4,4'-diphenylmethane diisocyanate in the isocyanate component and a compounding ratio of the trimellitic anhydride in the acid component, is in the range of 85 to 98 mol %;

the mixed solvent comprises γ-butyrolactone as a main solvent and at least one nitrogen-containing high boiling point polar solvent selected from the group consisting of N-methyl-2-pyrrolidone (NMP), N,N-dimethylformamide (DMF), and N,N-dimethylacetamide (DMAC); and an organo-silica sol comprising γ-butyrolactone as a main dispersion solvent of the organo-silica sol;

wherein the organo-silica sol is dispersed in the polyamide-imide resin insulating coating material; and γ-butyrolactone accounts for 70% by weight or more of the amount of all solvents of the polyamide-imide resin insulating coating material.

2. The polyamide-imide resin insulating coating material according to claim 1, wherein a silica component of the organo-silica sol accounts for 1 to 100 phr (parts per hundred parts of resin) by weight of a resin component of the polyamide-imide resin insulating coating material.

3. A method of making a polyamide-imide resin insulating coating material, comprising:

reacting an isocyanate component comprising (i) 4,4'-diphenylmethane diisocyanate and (ii) an isomer of 4,4'-diphenylmethane diisocyanate other than 4,4'-diphenylmethane diisocyanate, with an acid component comprising a trimellitic anhydride by using a mixed solvent comprising γ-butyrolactone as a main solvent and at least one nitrogen-containing high boiling point polar solvent selected from the group consisting of N-methyl-2-pyrrolidone (NMP), N,N-dimethylformamide (DMF), and N,N-dimethylacetamide (DMAC) to synthesize the polyamide-imide resin insulating coating material, wherein a total compounding ratio, obtained by averaging a compounding ratio of the 4,4'-diphenylmethane diisocyanate in the isocyanate component and a compounding ratio of the trimellitic anhydride in the acid component, is in the range of 85 to 98 mol %; and mixing the polyamide-imide resin insulating coating material with an organo-silica sol comprising γ-butyrolactone as a main dispersion solvent, wherein the organo-silica sol is dispersed in the polyamide-imide resin insulating coating material, and γ-butyrolactone accounts for 70% by weight or more of the amount of all solvents of the polyamide-imide resin insulating coating material.

4. The method according to claim 3, wherein: the acid component comprises 80 mol % or more of trimellitic anhydride and 20 mol % or less of a tetracarboxylic dianhydride.

5. The method according to claim 3, wherein: the acid component comprises 80 mol % or more of trimellitic anhydride and 20 mol % or less of tricarboxylic acid.

6. A method of making an insulated wire, comprising:

preparing a polyamide-imide resin insulating coating material by reacting an isocyanate component comprising (i) 4,4'-diphenylmethane diisocyanate and (ii) an isomer of 4,4'-diphenylmethane diisocyanate other than 4,4'-diphenylmethane diisocyanate, with an acid component comprising a trimellitic anhydride by using a mixed solvent comprising γ-butyrolactone as a main solvent and at least one nitrogen-containing high boiling point polar solvent selected from the group consisting of N-methyl-2-pyrrolidone (NMP), N,N-dimethylformamide (DMF), and N,N-dimethylacetamide (DMAC) to synthesize the polyamide-imide resin insulating coating material, wherein a total compounding ratio, obtained by averaging a compounding ratio of the 4,4'-diphenylmethane diisocyanate in the isocyanate component and a compounding ratio of the trimellitic anhydride in the acid component, is in the range of 85 to 98 mol %; and mixing the polyamide-imide resin insulating coating material with an organo-silica sol comprising γ-butyrolactone as a main dispersion solvent, wherein the organo-silica sol is dispersed in the polyamide-imide resin insulating coating material, and γ-butyrolactone accounts for 70% by weight or more of the amount of all solvents of the polyamide-imide resin insulating coating material; and coating the polyamide-imide resin insulating coating material and the organo-silica sol dispersed in the insulating coating material on a conductor, and then baking the polyamide-imide resin insulating coating material to form a coating film on the conductor.

7. A method of making an insulated wire, comprising:

preparing a polyamide-imide resin insulating coating material by reacting an isocyanate component comprising (i) 4,4'-diphenylmethane diisocyanate and (ii) an isomer of 4,4'-diphenylmethane diisocyanate other than 4,4'-diphenylmethane diisocyanate, with an acid component comprising a trimellitic anhydride by using a mixed solvent comprising γ-butyrolactone as a main solvent and at least one nitrogen-containing high boiling point polar solvent selected from the group consisting of N-methyl-2-pyrrolidone (NMP), N,N-dimethylformamide (DMF), and N,N-dimethylacetamide (DMAC) to synthesize the polyamide-imide resin insulating coating material, wherein a total compounding ratio, obtained by averaging a compounding ratio of the 4,4'-diphenylmethane diisocyanate in the isocyanate component and a compounding ratio of the trimellitic anhydride in the acid component, is in the range of 85 to 98 mol %;

mixing the polyamide-imide resin insulating coating material with an organo-silica sol comprising γ-butyrolactone as a main dispersion solvent, wherein the organo-silica sol is dispersed in the polyamide-imide resin insulating coating material, and γ-butyrolactone accounts for 70% by weight or more of the amount of all solvents of the polyamide-imide resin insulating coating material;

forming an organic insulation coating layer on the surface of a conductor, and coating the polyamide-imide resin insulating coating material on the organic insulation coating layer, and then baking the polyamide-imide resin insulating coating material to form a coating film on the organic insulation coating layer.

8. The polyamide-imide resin insulating coating material according to claim 1, wherein: the compounding ratio of the trimellitic anhydride to the acid component is 80 to 98 mol %.

9. The polyamide-imide resin insulating coating material according to claim 1, wherein: the compounding ratio of the trimellitic anhydride to the acid component is 80 to 100 mol %.

10. The polyamide-imide resin insulating coating material according to claim 3, wherein: the organo-silica sol is uniformly dispersed in the polyamide-imide resin insulating coating material.

11. The polyamide-imide resin insulating coating material according to claim 1, wherein:

the acid component further comprises an acid other than the trimellitic anhydride, the acid other than the trimellitic anhydride is an aromatic tetracarboxylic dianhydride selected from 3,3',4,4'-diphenylsulfone tetracarboxylic dianhydride, 3,3',4,4'-benzophenone tetracarboxylic dianhydride, and 4,4'-oxydiphthalic dianhydride; an alicyclic tetracarboxylic dianhydride selected from butanetetracarboxylic dianhydride and 5-(2,5-dioxotetrahydro-3-furanyl)-3-methyl-3-cyclohexene-1,2-dicarboxylicanhydride; or a tricarboxylic acid selected from trimesic acid and tris-(2-carboxyethyl)isocyanurate.

12. The method according to claim 3, wherein:

the acid component further comprises an acid other than the trimellitic anhydride, the acid other than the trimellitic anhydride is an aromatic tetracarboxylic dianhydride selected from 3,3',4,4'-diphenylsulfone tetracarboxylic dianhydride, 3,3',4,4'-benzophenone tetracarboxylic dianhydride, and 4,4'-oxydiphthalic dianhydride; an alicyclic tetracarboxylic dianhydride selected from butanetetracarboxylic dianhydride and 5-(2,5-dioxotetrahydro-3-furanyl)-3-methyl-3-cyclohexene-1,2-dicarboxylicanhydride; or a tricarboxylic acid selected from trimesic acid and tris-(2-carboxyethyl)isocyanurate.

13. The method according to claim 6, wherein:

the acid component further comprises an acid other than the trimellitic anhydride, the acid other than the trimellitic anhydride is an aromatic tetracarboxylic dianhydride selected from 3,3',4,4'-diphenylsulfone tetracarboxylic dianhydride, 3,3',4,4'-benzophenone tetracarboxylic dianhydride, and 4,4'-oxydiphthalic dianhydride; an alicyclic tetracarboxylic dianhydride selected from butanetetracarboxylic dianhydride and 5-(2,5-dioxotetrahydro-3-furanyl)-3-methyl-3-cyclohexene-1,2-dicarboxylicanhydride; or a tricarboxylic acid selected from trimesic acid and tris-(2-carboxyethyl)isocyanurate.

14. The method according to claim 7, wherein:

the acid component further comprises an acid other than the trimellitic anhydride, the acid other than the trimellitic anhydride is an aromatic tetracarboxylic dianhydride selected from 3,3',4,4'-diphenylsulfone tetracarboxylic dianhydride, 3,3',4,4'-benzophenone tetracarboxylic dianhydride, and 4,4'-oxydiphthalic dianhydride; an alicyclic tetracarboxylic dianhydride selected from butanetetracarboxylic dianhydride and 5-(2,5-dioxotetrahydro-3-furanyl)-3-methyl-3-cyclohexene-1,2-dicarboxylicanhydride; or a tricarboxylic acid selected from trimesic acid and tris-(2-carboxyethyl)isocyanurate.

15. The polyamide-imide resin insulating coating material according to claim 1, wherein the solvent for the polyamide-imide resin insulating coating material is a mixed solvent comprising 73-88% by weight of said γ-butyrolactone.

16. The method according to claim 3, wherein the solvent for the polyamide-imide resin insulating coating material is a mixed solvent comprising 73-88% by weight of said γ-butyrolactone.

17. The method according to claim 6, wherein the solvent for the polyamide-imide resin insulating coating material is a mixed solvent comprising 73-88% by weight of said γ-butyrolactone.

18. The method according to claim 7, wherein the solvent for the polyamide-imide resin insulating coating material is a mixed solvent comprising 73-88% by weight of said γ-butyrolactone.

* * * * *